United States Patent [19]

Cain et al.

[11] Patent Number: 4,988,193
[45] Date of Patent: Jan. 29, 1991

[54] METHOD AND APPARATUS FOR MEASURING INCIDENT LIGHT ANGLE RELATIVE TO LEVEL

[75] Inventors: Gary L. Cain, New Carlisle; Mark D. Sobottke, Kettering; Gerald H. Church, Huber Heights; James T. Zalusky, Beavercreek, all of Ohio

[73] Assignee: Spectra-Physics, Inc., San Jose, Calif.

[21] Appl. No.: 317,512

[22] Filed: Mar. 1, 1989

[51] Int. Cl.[5] .................. G01C 1/00; G01C 9/18; G01D 5/36
[52] U.S. Cl. .................. 356/152; 250/233; 356/138; 356/146; 356/148; 356/151; 356/249; 356/253; 33/283
[58] Field of Search ............... 356/141, 152, 138, 144, 356/146, 148, 151, 248, 249, 253, 400; 33/281–283, 285, 290–292; 250/232, 233

[56] References Cited

U.S. PATENT DOCUMENTS

| | | |
|---|---|---|
| 2,876,673 | 3/1959 | Hamilton . |
| 3,044,343 | 7/1962 | de Fontguyon . |
| 3,520,621 | 7/1970 | Blesch et al. . |
| 3,583,814 | 6/1971 | Shumway, Jr. . |
| 3,905,707 | 9/1975 | Feist et al. . |
| 3,910,704 | 10/1975 | Richarme . |
| 4,149,321 | 4/1979 | Kivioja . |
| 4,154,532 | 5/1979 | Emmerich . |
| 4,335,306 | 6/1982 | Gort et al. ............... 250/231 SE |
| 4,502,783 | 3/1985 | Lau et al. ............... 356/152 |
| 4,666,299 | 5/1987 | Tamaki et al. . |
| 4,798,461 | 1/1989 | Pavlin et al. ............... 356/138 |

Primary Examiner—Thomas H. Tarcza
Assistant Examiner—Linda J. Wallace
Attorney, Agent, or Firm—Killworth, Gottman, Hagan & Schaeff

[57] ABSTRACT

Apparatus operable in accordance with the method of the present invention for measuring the angle of incidence of a light beam or plane relative to level comprises a photodetector array for sensing the light and a level mirror preferably comprising a pool of mercury. Optics are provided for transmitting the light to the photodetector array in alignment with the angle of incidence of the light (aligned light) and also after the light has been reflected from the mercury pool (reflected light). A shutter is provided for separating aligned light from reflected light such that distinct signals representative of the two are generated by the photodetector array. The distinct signals are processed by up-counting and down-counting a counter circuit to determine the average centers of light spots representative of the aligned light and the reflected light and the distance between those average centers which is representative of the deviation of the light beam or plane from level.

20 Claims, 3 Drawing Sheets

METHOD AND APPARATUS FOR MEASURING INCIDENT LIGHT ANGLE RELATIVE TO LEVEL

BACKGROUND OF THE INVENTION

The present invention relates generally to light beams or planes, for example those generated by means of a stationary or rotating laser beam and used in levelling, squaring and other alignment and control functions in the building and construction industry and, more particularly, to a method and apparatus for measuring the angle of incidence of such a light beam or plane relative to level.

When using a light beam or plane in the building and construction industry, it is important to be able to position the light source such that the emitted light is level. To determine the angle of incidence of a light beam or plane, it has been the practice to establish a vertical reflective surface upon which the light is directed. A light screen through which the light can pass is positioned parallel to and a precisely defined distance from the vertical reflective surface. The distance between the point or line at which the light enters the light screen and the point or line at which the light exits the light screen together with the distance separating the vertical reflective surface and the light screen can be used to compute the angle of the light beam or plane relative to level.

Problems associated with this form of measuring technique include the positioning of the reflective surface in an absolutely vertical orientation. Further, for high resolution and accuracy, the separation distance between the vertical reflective surface and the light screen should be substantial. Accordingly, an instrument incorporating this technique of angle measurement must be a compromise in terms of an instrument which is of manageable size and an instrument which can accurately and easily perform the measurement.

Thus, there is a need for a method and apparatus for measuring the angle of incidence of a light beam or plane relative to level which does not require a truly vertical reflective surface or a pair of parallel planes, preferably spaced a substantial distance from one another.

SUMMARY OF THE INVENTION

This need is met by the method and apparatus of the present invention for measuring the angle of incidence of a light beam or plane relative to level wherein a linear array of photodiodes is positioned to receive light transmitted in alignment with the angle of incidence of incoming light (aligned light) and also light which is reflected from a gravitationally level reflective surface (reflected light). The incidence angle measuring system discriminates or separates the aligned light from the reflected light such that distinct signals representative of the aligned light and the reflected light are generated by the photodiode array. By processing the signals representative of the aligned light and the reflected light, the system determines the angle of incidence of the light beam or plane. The level gravitationally reflective surface is preferably established by means of a pool of mercury which is sufficiently large that the beam to be reflected from the level reflective surface is always directed at a central portion of the pool which is away from the meniscus of the mercury pool such that the reflective surface is always substantially flat and level.

In accordance with one aspect of the present invention, apparatus for measuring the angle of incidence of a light beam or plane relative to level comprises photodetector means for sensing the light and first mirror means for defining a gravitationally level reflective surface. Optical means are provided for transmitting the light to the photodetector means in alignment with the angle of incidence as aligned light and also after the light has been reflected from the first mirror means as reflected light. Discriminating means provide for separating aligned light transmitted to the photodetector means from reflected light transmitted to the photodetector means such that distinct signals representative of aligned light and reflected light are generated by the photodetector means. Control means are provided for processing the distinct signals to determine the angle of incidence of the light. Preferably, the first mirror means comprises a pool of mercury.

The discriminating means may comprise a shutter movable to selectively block either the transmission of aligned light to the photodetector means or the transmission of reflected light to the photodetector means. The shutter may be mounted for rotation and includes an aperture for passing aligned light or reflected light with the aperture being positioned by rotation of the shutter. The optical means may comprise a lens system for focusing the light onto the photodetector means. The optical means may further comprise a beam splitter for reflecting a portion of the light to second mirror means which in turn reflects the light to the first mirror means to generate the reflected light. and also for passing the remainder of the light to a retroreflector to generate the aligned light. Light reflected by the first mirror means passes through the beam splitter to fall upon the lens system and light reflected by the retroreflector reflects from the beam splitter to fall upon the lens system. In the preferred form of the invention, the light path of the retroreflector is substantially perpendicular to the light path of the first mirror means, and the light path of the photodetector means is positioned between the first two light paths such that the apparatus can be compactly packaged. In this arrangement of the invention, the shutter is mounted in alignment with and surrounding the light path of the photodetector with the shutter being annular and extending into the light paths of the first mirror means and the retroreflector.

The photodetector means preferably comprises a photodiode array. Since the source of the light beam or plane typically will include some vibratory motion, the control means preferably comprises means for averaging a substantial number of the distinct signals to obtain repeatable, meaningful results in spite of such vibrations. Also, since the intensity of the light beam or plane can vary greatly from source to source, preferably the control means further comprises adaptive threshold means for setting a threshold based on the signal levels of the distinct signals. For example, the adaptive threshold means may comprise a sample and hold circuit and a potentiometer for selecting a fraction of one or an average of several output signals generated by the sample and hold circuit.

To simplify the design of the measuring apparatus, the averaging means preferably comprises counter means for maintaining a running count which is up-counted during sampling of the distinct signals which occurs while the photodetector means is lighted by aligned light and is down-counted during sampling of the distinct signals which occurs while the photodetector means is lighted by reflected light. Alternately, the counter means can be down-counted during sampling of the distinct signals which occurs while the photodetector means is lighted by aligned light and up-counted during sampling of the distinct signals which occurs while the photodetector means is lighted by reflected light. The counter means includes precounters for dividing the total counts by the number of samples taken to arrive at an average value.

In accordance with another aspect of the present invention, a method for measuring the angle of incidence of a light beam or plane relative to level comprises the steps of: providing photodetector means for sensing the light: defining a gravitationally level reflective surface by first mirror means: transmitting the light to the photodetector means in alignment with the angle of incidence as aligned light: transmitting the light to the photodetector means after the light has been reflected from the first mirror means as reflected light: separating aligned light transmitted to the photodetector means from reflected light transmitted to the photodetector means: generating distinct signals representative of aligned light and reflected light by the photodetector means: and, processing the distinct signals to determine the angle of incidence of the light beam or plane.

Preferably, the first mirror means comprises a pool of mercury, the reflected light and the aligned light comprise light spots on the photodetector means with the light spots having a leading edge and a trailing edge, and the step of processing the distinct signals comprises: up-counting a counter during receipt of the distinct signals corresponding to the reflected light: and down-counting the counter during receipt of the distinct signals corresponding to the aligned light. Alternately, the counter may be up-counted during receipt of the distinct signals corresponding to the aligned light and down-counted during receipt of the distinct signals corresponding to the reflected light.

In either event, the up-counting and down-counting is performed such that the location of the light spot on the photodetector means is determined. In a particularly advantageous arrangement, the up-counting and down-counting is performed at a rate 2x until the leading edges of the light spots are encountered and at a rate x between the leading edges and trailing edges of the light spots. By thus counting, the resulting count is proportional to the center of the light spot. The method may further comprise the step of generating a variable threshold in response to the distinct signals with the variable threshold determining the leading and trailing edges of the light spots.

It is thus an object of the present invention to provide a method and apparatus for measuring the angle of incidence of a light beam or plane relative to level by means of a level reflective surface which is continuously maintained, preferably by means of a pool of mercury: to provide a method and apparatus for measuring the angle of incidence of a light beam or plane relative to level by focusing a light beam in alignment with the angle of incidence of incoming light onto a photodetector array and also focusing a light beam reflected from a level reflective surface such that the distance between the two spots is representative of the angle of incidence of the light relative to level: and, to provide a method and apparatus for measuring the angle of incidence of a light beam or plane relative to level wherein a plurality of light samples are averaged for both aligned and reflected light by means of maintaining a running count which is up-counted during sampling of signals generated during receipt of aligned or reflected light and down-counted during sampling of the signals which occurs during receipt of the reflected or aligned light, respectively.

Other objects and advantages of the invention will be apparent from the following description, the accompanying drawings and the appended claims.

DETAILED DESCRIPTION OF THE INVENTION

Figure 1:
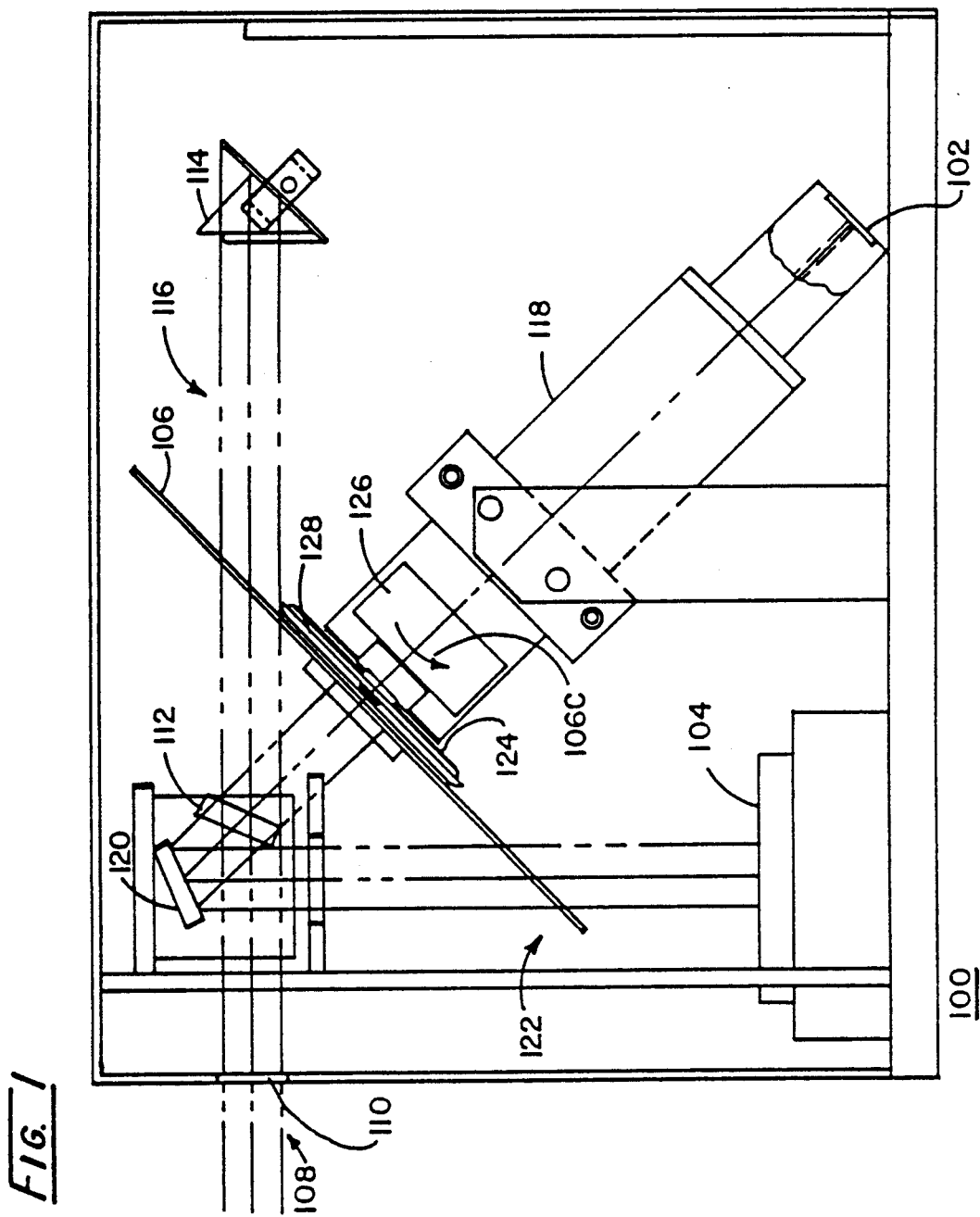
FIG. 1 is a schematic side view of an incidence angle measuring system operable in accordance with the present invention.

A schematic side view of apparatus 100 for measuring the angle of incidence of a light beam or plane relative to level is shown in FIG. 1. The apparatus 100 includes photodetector means, comprising a linear photodiode array 102 in the illustrative embodiment for sensing the light. First mirror means define a gravitationally level reflective surface or level mirror 104 and optical means are provided for transmitting light to the photodiode array 102 after the light has been reflected from the level mirror 104 which light will be referred to herein as "reflected light." The optical means also provides for transmitting the light to the photodiode array 102 in alignment with the angle of incidence which light will be referred to herein as "aligned light." Discriminating means comprising an annular shutter 106 provides for separating aligned light transmitted to the photodiode array 102 from reflected light transmitted to the photodiode array 102 such that distinct signals representative of aligned light and reflected light are generated by the photodiode array 102. Preferably, the first mirror means or level mirror 104 comprises a pool of mercury: however, other "floating mirror" arrangements or the like can be utilized in the present invention to define a gravitationally level reflective surface.

As shown in FIG. 1, the apparatus 100 is positioned such that a beam or plane of light 108 enters through a window 110 of the apparatus 100. The light 108 first encounters a portion of the optical means comprising a beam splitter 112. A first portion, approximately half, of the light 108 passes through the beam splitter 112 to a retroreflector 114 along a light path 116. This light is retroreflected back to the beam splitter 112 along the light path 116. Approximately half of this light, the aligned light, is directed by the beam splitter 112 to a lens system 118 for focusing the light onto the photodiode array 102.

A second portion, approximately half, of the light 108 will be reflected by the beam splitter 112 and directed to second mirror means comprising an angularly oriented mirror 120. The mirror 120 reflects light received from the beam splitter 112 to the level mirror 104 along a light path 122. The light is reflected from the level mirror 104, for example from the upper surface of a pool of mercury, and is once again reflected by the mirror 120 to the beam splitter 112. Approximately half of the light which is reflected by the level mirror 104 passes through the beam splitter 112 as reflected light to fall upon the lens system 118.

The lens system 118 is constructed such that the angle of the light entering the lens system 118 is translated to a linear position along the photodiode array 102. Accordingly, the apparatus 100 will work whether the input light 108 is collimated or not. For noncollimated light, the light spot which falls upon the photodiode array 102 will be somewhat defocused; however, the light spot will be correctly linearly positioned along the array 102. Thus, the reflected light and the aligned light are both directed upon the photodiode array 102 with the linear positioning along the array 102 being determined by the angle of incidence of the light 108 upon the lens system 118.

It should be apparent from the above description and a review of FIG. 1 that the reflected light (reflected from the level mirror 104) serves as a reference point along the photodiode array 102. If the aligned light (from the retroreflector 114) is coincident with the reflected light on the photodiode array 102, the incoming light 108 is level. Otherwise, the aligned light is linearly displaced from the reflected light by an amount corresponding to twice the angle of incidence of the light 108 relative to level. By making the reflective surface of the first mirror means 104 always level, for example by utilizing the central portion of a pool of mercury, the concern of being able to accurately position a true vertical reflective plane is eliminated.

Figure 5:
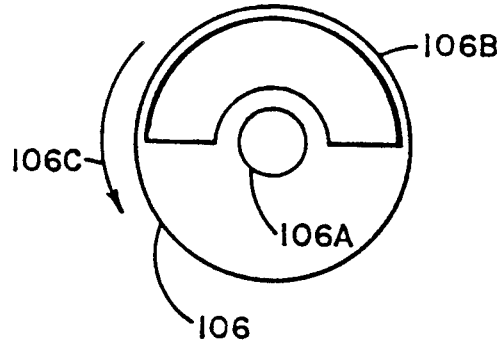
FIG. 5 is an illustrative embodiment of a shutter for use in the present invention.

While the operation of the present method and apparatus can be determined from the foregoing description and a review of FIG. 1, various problems are encountered in accurately determining the angle of incidence of the light 108 relative to level. Initially, the reflected light from the level mirror 104 must be separated from the aligned light from the retroreflector 114. This is accomplished by the discriminating means or shutter 106 as shown in FIG. 5. A center opening 106A permits light to be directed upon the lens system 118 while an arcuate aperture 106B passes either the reflected light from the level mirror 104 or the aligned light from the retroreflector 114. As shown in FIG. 1, a pulley 124 is connected to the shutter 106 and a drive motor 126 which is mounted to the lens system 118 drives the pulley 124 by means of a circular drive belt 128. By rotating the shutter 106, it can be seen that either reflected light from the level mirror 104 or aligned light from the retroreflector 114 is passed to the lens system 118 and hence is focused upon the photodiode array 102.

The method and apparatus of the present invention must translate a separation distance between two spots of light incident on the photodiode array 102 into a human readable display of the incident angle of a light beam or plane which generates the spots. In a working embodiment, the last reading is held until an operator activates a switch which causes another incident angle measurement operation to be performed. Preferably, the switch comprises a foot switch which can be activated by an operator without moving the apparatus 100.

The remaining description of the method and apparatus of the present invention describes operating characteristics of the system for accommodating a number of poorly controlled variables in the environment in which the system must operate. It is initially noted that commercially available light plane sources typically vibrate such that it is necessary to average a number of samples in order to obtain repeatable readings. It has been determined that for such sources it is satisfactory to average the samples taken for two seconds with data samples being taken approximately every 30 milliseconds (64 usable samples).

Figure 2:
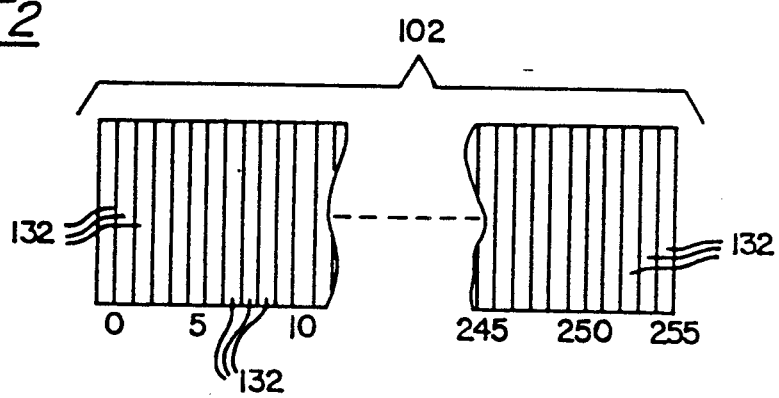
FIG. 2 illustrates a photodiode array which can be utilized in the present invention.

Another problem is the low light level of light beams and planes which are to be measured. To obtain satisfactory signal levels, a photodiode array was selected wherein individual cells 132 of the array 102 are approximately 0.001 inches wide by 0.010 inches long as shown in FIG. 2. In a working embodiment of the present invention, an EG&G Reticon of Sunnyvale, California K series photodiode array having 256 array elements (RL0256K) was selected. In addition to the large cell sizes, the signals generated by the cells 132 of the photodiode array 102 are integrated for the longest possible time.

Figure 3:
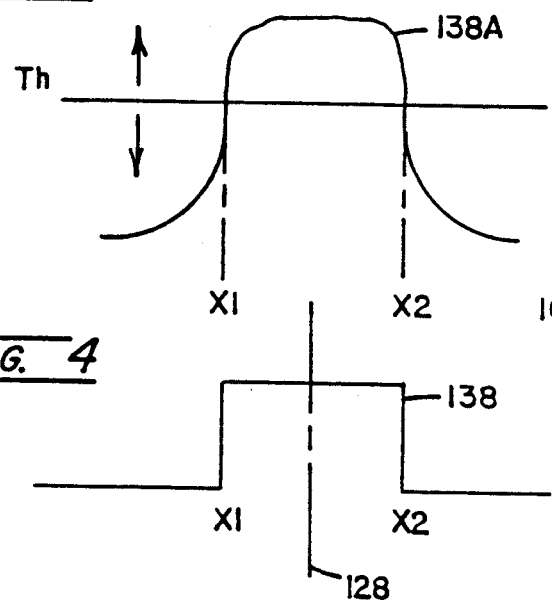
FIG. 3 is a waveform generated by the photodiode array of FIG. 2 in response to a light spot incident thereon illustrating adaptive threshold setting of the present invention.

The intensity of the light also may vary by a factor of 5 or greater from the brightest light source to the dimmest light source. In addition, "noise" is proportional to the signal strength. Hence, a fixed threshold will miss some signals and pick up substantial noise on others. To accommodate intensity variations, an adaptive threshold is utilized to determine the leading and trailing edges of the light spots. As shown in FIG. 3, an adaptive threshold $T_h$ is established based on the first sample or light spot in each two second sample period. A new threshold is thus set for each sample period such that one threshold is set for the reflected light from the level mirror 104 and another threshold is set for the aligned light from the retroreflector 114.

Figure 4:
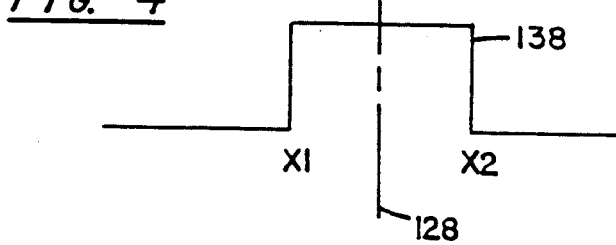
FIG. 4 is a waveform generated by thresholding a light spot signal generated by the photodiode array of FIG. 2.
Figure 6:
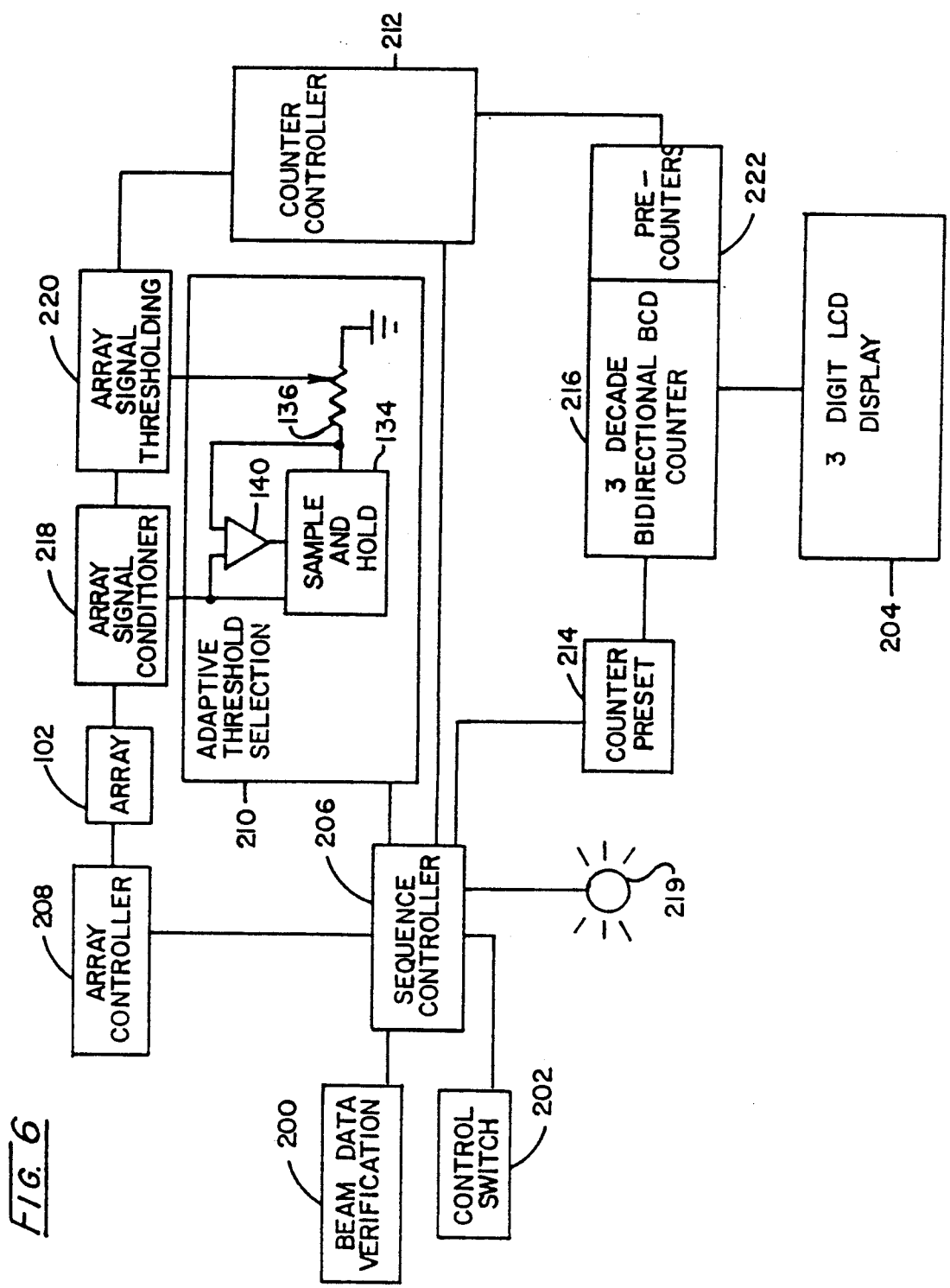
FIG. 6 is a schematic block diagram showing the interconnection of electronic components for operation of the system of FIG. 1.

The initial sample of each sample period is taken and passed to a sample and hold circuit 134, see FIG. 6. A fractional portion of the output of the sample and hold circuit 134 is selected by means of a potentiometer 136 which can select anywhere from zero volts to the peak output signal of the sample and hold circuit 134. Typically, 60%–65% of the peak output signal of the sample and hold circuit 134 is taken as the adaptive threshold $T_h$ value. As shown in FIGS. 3 and 4, once the threshold value $T_h$ is established by the selected portion of the output signal of the sample and hold circuit 134, the leading and trailing edges of the remaining 64 samples taken during the two second sampling period are determined based on this threshold.

Further, the light spot size and hence the width of the light pulse generated by the photodiode array 102, varies from light source to light source such that a simple technique like finding the leading or trailing edge of the light spots or corresponding output pulses will not work. Accordingly, the centers of the pulses are found in real time utilizing a pulse counting technique. A sample pulse 138 is generated by thresholding or comparing an output signal 138A from the photodiode array 102 to the current threshold $T_h$ as shown in FIGS. 3 and 4. The pulse 138 extends from and includes the signals from photodiode cell $X_1$ to photodiode cell $X_2$. Accordingly, the center 128 of the pulse 138 is determined by the formula $(X_1+X_2)/2$. By noting that $X_2$ is equal to $X_1+DX$, the center 128 can be expressed as $(2X_1+DX)/2$.

Two clocks are used to operate a three decade bidirectional BCD counter. One clock is running at the pixel rate x at which data is read from the photodiode array 102 while another clock is run at twice the pixel rate 2x. The center 120 of the pulse 138 is determined by counting at twice the pixel rate 2x until the leading edge of the pulse $X_1$ is encountered. The clock rate is then shifted to the pixel rate x with clock counting being terminated at $X_2$ such that a count of $(2X_1+DX)$ is held in the counter and is proportional to the center 128 of the pulse 138.

By determining an average pulse center for the 64 samples taken while reflected light from the level mirror 104 is being directed to the photodiode array 102, then determining an average center for the 64 samples taken while the aligned light from the retroreflector 114 is being directed to the photodiode array 102 and comparing the two, the deviation of the light 108 from level can be determined. Preferably, the inclination measuring system is sized such that each pixel or cell 132 of separation of the average centers of the reflected light and the aligned light of the photodiode array 102 represents one arcsecond of deviation from level. However, in a working embodiment, it proved more convenient to size the system such that one pixel of separation is equal to two arcseconds of deviation from level. This sizing required interpolation to determine the deviation from level which was to be displayed by the system: however, the interpolation was conveniently performed by utilizing the value $(2X_1+DX)$ directly without dividing that value by 2.

While the control of the inclination measuring apparatus 100 may be implemented in a number of ways, a schematic block diagram of associated electronics is shown in FIG. 6. As previously mentioned, the shutter 106, as shown in FIGS. 1 and 5, is rotated as indicated by an arrow 106C to allow the light to either travel along the path 116 to the retroreflector 114 or along the path 122 to the level mirror 104. The shutter 106 is rotated such that the optical paths 116 and 122 are opened for alternating two second intervals. Beam data verification 200 is performed by two optical interrupters (not shown) which monitor the shutter 106. One of the interrupters identifies whether the level mirror 104 or the retroreflector 114 is in view while the other optical interrupter indicates whether the data being received is valid during a transition in the shutter position.

A control switch 202, preferably comprising a foot switch, is activated by the operator of the apparatus 100 to initiate a measurement cycle. Between measurement cycles the data generated during the last cycle is held and displyed on a three digit LCD display 204. Signals from the beam data verification 200 and the control switch 202 are passed to a sequence controller 206 which, in a working embodiment of the invention, comprises an Altera programmable logic chip. The sequence controller 106 is connected to an array controller 208, an adaptive threshold selection circuit 210, a counter controller 212 and a counter preset circuit 214 to sequence and control functions of the electronics of FIG. 6.

At the beginning of a cycle which is signaled by operation of the control switch 202, the sequence controller 206 waits until the shutter 106 has passed through a transition to ensure that a full two second time interval is available for data collection. After the end of the transition, the sequence controller 206 waits for the second sample from the photodiode array 102 to be sure that any data collected during the transition has been purged from the array 102. The sequence controller 206 then collects one sample of 256 amplitude signals from the array 102 to set the adaptive threshold $T_h$ and then enables a counter 216.

After taking 64 samples of the amplitude signals from the array 102, the sequence controller 206 waits for the next shutter transition. If the data valid signal disappears before 64 scans can be completed, the sequence controller 206 signals an error condition. After the end of the next shutter transition, a new threshold is determined and data collection on the second optical path commences. After 64 scans have been sampled, a "done" light 219 is lit and the measurement is complete and the resulting value stored and displayed on the three digit LCD display 204. The array controller 208 may comprise an Altera programmable logic chip which provides signals required by the array 102 including clock, recharge start and sample signals. A crystal oscillator and counter (not shown) provide the basic timing from which the array controller 208 synthesizes the array control signals.

Signals representative of the light focused upon the individual pixels or cells 132 of the photodiode array 102 are serially read from the array 102 such that there is a precise correlation between position of light on the array 102 and the time since a start pulse in the output signal is passed from the array 102. The signals generated by the array 102 are differential pairs of pulses whose heights encode the light intensity. An array signal conditioner 218, preferably comprising a differential amplifier and a sample and hold circuit (not shown), convert these differential pulse pairs to a continuous single ended signal.

The preliminary stable sample from each sequence of aligned light and reflected light is captured by the sample and hold circuit 134 which is controlled by a comparator 140 which commands the sample and hold circuit 134 to sample whenever the input exceeds the output and to hold otherwise. A selectable fraction of the output of the sample and hold circuit 134, typically 60-65%, is selected by the potentiometer 136. An array signal thresholding circuit 220 compares the array signals to the adaptive threshold to generate the waveform representative of a corresponding light spot as shown in FIGS. 3 and 4.

The counter controller 212, which may comprise an Altera programmable logic chip, selects one of two clock signals to pass to the counter 216. The counter controller 212 supplies a clock signal which is twice the pixel rate clock of the array 102 (2x) to a "count-up" input of the counter 216 during the first half of the measurement cycle and before the signal arrives, i.e., up to $X_1$. While the signal or light pulse is present, i.e., between $X_1$ and $X_2$, the counter controller 212 supplies a clock signal which is equal to the pixel rate clock (x). After the signal or light pulse is gone, i.e., after $X_2$, no clock is supplied to the counter 216. Clocking signals are similarly applied during the 64 samples of the second half of the measurement cycle except that the count signals are applied to a "count-down" input of the counter 216. The counter controller 212 also looks for error conditions, such as no beam or out of range, and monitors rollovers of the counter 216 to determine the sign of the output signal which is passed to the three digit LCD display 204. Precounters 222 divide the count signals by 64 to determine an average of the 64 samples taken during the two second intervals previously described.

Offset errors of the inclination measuring system 100 can easily be corrected by means of a counter preset circuit 214. Calibration is performed by measuring the performance of the system to determine any offset error which may exist. This error can then be calibrated out of the system by setting the counter preset circuit 214, which preferably comprises DIP switches to preset the counter 216 prior to the beginning of each measurement cycle.

Having described the invention in detail and by way of reference to preferred embodiments thereof, it will be apparent that other modifications and variations are possible without departing from the scope of the invention defined in the appended claims.

What is claimed is:

1. Apparatus for measuring the angle of incidence of a light beam or plane relative to level comprising:
    photodetector means for sensing said light beam or plane and generating signals representative thereof;
    first mirror means for defining a gravitationally level reflective surface;
    optical means for transmitting a first portion of said light beam or plane to said photodetector means in alignment with said angle of incidence as aligned light, and a second portion of said light beam or plane to said first mirror means and after reflection therefrom to said photodetector means as reflected light;
    discriminating means for separating aligned light transmitted to said photodetector means from reflected light transmitted to said photodetector means such that distinct signals representative of aligned light and reflected light are generated by said photodetector means; and
    control means for processing said distinct signals to determine the angle of incidence of said light.

2. Apparatus for measuring the angle of incidence of a light beam or plane relative to level as claimed in claim 1 wherein said first mirror means comprises a pool of mercury.

3. Apparatus for measuring the angle of incidence of a light beam or plane relative to level as claimed in claim 2 wherein said discriminating means comprises a shutter movable to selectively block the transmission of aligned light to said photodetector means or the transmission of reflected light to said photodetector means.

4. Apparatus for measuring the angle of incidence of a light beam or plane relative to level as claimed in claim 3 wherein said shutter is mounted for rotation and includes an aperture for passing aligned light or reflected light, said aperture being selectively positioned by rotation of said shutter.

5. Apparatus for measuring the angle of incidence of a light beam or plane relative to level as claimed in claim 4 wherein said optical means comprises a lens system for focusing said light onto said photodetector means.

6. Apparatus for measuring the angle of incidence of a light beam or plane relative to level as claimed in claim 5 wherein said optical means further comprises a beam splitter reflecting light to second mirror means which in turn reflects light to said first mirror means to generate said reflected light, and for passing light to a retroreflector to generate said aligned light, light reflected by said first mirror means passing through said beam splitter after being rereflected from said second mirror means to fall upon said lens system and light reflected by said retroreflector reflecting from said beam splitter to fall upon said lens system.

7. Apparatus for measuring the angle of incidence of a light beam or plane relative to level as claimed in claim 6 wherein a light path to said retroreflector is substantially perpendicular to a light path to said first mirror means and a light path to said photodetector means is positioned therebetween such that said apparatus can be compactly packaged.

8. Apparatus for measuring the angle of incidence of a light beam or plane relative to level as claimed in claim 7 wherein said shutter is mounted in alignment with and surrounding the light path to said photodetector, said shutter being annular and extending into the light paths to said first mirror means and to said retroreflector.

9. Apparatus for measuring the angle of incidence of a light beam or plane relative to level as claimed in claim 8 wherein said photodetector means comprises a photodiode array.

10. Apparatus for measuring the angle of incidence of a light beam or plane relative to level as claimed in claim 9 wherein said control means comprises means for averaging a substantial number of said distinct signals to obtain repeatable results in spite of vibrations in said light beam or plane.

11. Apparatus for measuring the angle of incidence of a light beam or plane relative to level as claimed in claim 10 wherein said control means further comprises adaptive threshold means for setting a threshold based on said distinct signals.

12. Apparatus for measuring the angle of incidence of a light beam or plane relative to level as claimed in claim 11 wherein said adaptive threshold means comprises a sample and hold circuit having an output and a potentiometer connected to said output for selecting a fractional portion of an output signal generated by said sample and hold circuit on said output.

13. Apparatus for measuring the angle of incidence of a light beam or plane relative to level as claimed in claim 12 wherein said averaging means comprises counter means for maintaining a running count which is up-counted during sampling of said distinct signals which occurs while said photodetector means is lighted by aligned light and is down-counted during sampling of said distinct signals which occurs while said photodetector means is lighted by reflected light.

14. Apparatus for measuring the angle of incidence of a light beam or plane relative to level as claimed in claim 13 wherein said counter means include precounters for dividing the total counts by the number of samples taken to arrive at an average value.

15. A method for measuring the angle of incidence of a light beam or plane relative to level comprising the steps of:
    providing photodetector means for sensing said light beam or plane;
    defining a gravitationally level reflective surface by first mirror means;
    transmitting a first portion of said light beam or plane to said photodetector means in alignment with said angle of incidence as aligned light;
    transmitting a second portion of said light beam or plane to said first mirror means and after reflection therefrom to said photodetector means as reflected light;

separating aligned light transmitted to said photodetector means from reflected light transmitted to said photodetector means;

generating distinct signals representative of aligned light and reflected light by said photodetector means; and processing said distinct signals to determine the angle of incidence of said light.

16. A method for measuring the angle of incidence of a light beam or plane relative to level as claimed in claim 15 wherein said first mirror means comprises a pool of mercury.

17. A method for measuring the angle of incidence of a light beam or plane relative to level as claimed in claim 16 wherein said reflected light and said aligned light comprise light spots on said photodetector means, said light spots having a leading edge and a trailing edge and said step of processing said distinct signals comprises:

up-counting a counter during receipt of said distinct signals representative of said reflected light; and down-counting said counter during receipt of said distinct signals representative of said aligned light.

18. A method for measuring the angle of incidence of a light beam or plane relative to level as claimed in claim 16 wherein said reflected light and said aligned light comprise light spots on said photodetector means, said light spots having a leading edge and a trailing edge and said step of processing said distinct signals comprises:

up-counting a counter during receipt of said distinct signals representative of said aligned light; and down-counting said counter during receipt of said distinct signals representative of said reflected light.

19. A method for measuring the angle of incidence of a light beam or plane relative to level as claimed in claim 18 wherein the up-counting and down-counting is performed at a rate $2x$ until the leading edges of said light spots are encountered and at a rate $x$ between the leading edges and the trailing edges.

20. A method for measuring the angle of incidence of a light beam or plane relative to level as claimed in claim 18 further comprising the step of generating a variable threshold in response to said distinct signals, said variable threshold determining the leading and trailing edges of said light spots.

* * * * *